(12) United States Patent
Yoo et al.

(10) Patent No.: US 6,233,217 B1
(45) Date of Patent: May 15, 2001

(54) OPTICAL PICKUP FOR RECORDING/REPRODUCTION WITH A LIGHT EMITTING DIODE LIGHT SOURCE

(75) Inventors: Jang-hoon Yoo; Chul-woo Lee, both of Seoul; Kun-ho Cho, Suwon, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/087,861

(22) Filed: Jun. 1, 1998

(30) Foreign Application Priority Data

Aug. 30, 1997 (KR) ................................................ 97-44409

(51) Int. Cl.$^7$ ....................................................... G11B 7/00
(52) U.S. Cl. ...................................... 369/112.27; 369/121
(58) Field of Search ................................... 369/112, 121, 369/13, 114, 110, 44.37, 44.23, 44.12; 437/126, 129; 372/92, 94, 6

(56) References Cited

U.S. PATENT DOCUMENTS

| | | | |
|---|---|---|---|
| 4,720,824 | * | 1/1988 | Hayashi ................................ 369/112 |
| 4,815,067 | | 3/1989 | Webster et al. ........................ 369/97 |
| 4,978,187 | * | 12/1990 | Minemura et al. .................... 369/53 |
| 5,195,152 | | 3/1993 | Gupta ................................. 369/44.12 |
| 5,418,765 | * | 5/1995 | Misawa et al. .................... 369/44.12 |
| 5,559,773 | * | 9/1996 | Kentatsu et al. .................. 369/44.42 |
| 5,674,778 | * | 10/1997 | Lee et al. .............................. 437/126 |
| 5,784,352 | * | 7/1998 | Swanson et al. ...................... 369/94 |
| 5,790,583 | * | 8/1998 | Ho ......................................... 372/92 |
| 5,887,009 | * | 3/1999 | Mandella et al. ........................ 372/6 |
| 5,903,525 | * | 5/1999 | McDaniel et al. ..................... 369/114 |
| 6,034,938 | * | 3/2000 | Heanue et al. ....................... 369/112 |

FOREIGN PATENT DOCUMENTS 0 483 438 A1    5/1992 (EP).
0 648 049 A1    4/1995 (EP).

* cited by examiner

*Primary Examiner*—Thang V. Tran
*Assistant Examiner*—Kim-Kwok Chu
(74) *Attorney, Agent, or Firm*—Staas & Halsey LLP

(57) ABSTRACT

An optical pickup for recording/reproduction. The optical pickup includes a light source unit including a light emitting diode (LED) to emit light and a waveguide to condense the light emitted from the LED; a collimating lens to collimate the light emitted from the waveguide; an objective lens to condense the light passed through the collimating lens to form a light spot on the recording surface of a recording medium; a light path changing unit arranged on an optical path between the collimating lens and the objective lens, to change a traveling path of the incident light; and a photo-detector to receive the light incident via the objective lens and the light path changing unit after being reflected from the recording medium.

24 Claims, 3 Drawing Sheets

OPTICAL PICKUP FOR RECORDING/ REPRODUCTION WITH A LIGHT EMITTING DIODE LIGHT SOURCE

BACKGROUND OF THE INVENTION

1. Field of the Invention

The present invention relates to an optical pickup, and more particularly, to an optical pickup capable of performing a high-density recording or reproduction.

2. Description of the Related Art

In general, an optical pickup is adopted to a disk player to record or reproduce information such as image and sound on or from a disk type recording medium. To increase the recording density on a recording medium, the size of a light spot formed on the recording medium must be made as small as possible by an objective lens of an optical pickup. To this end, the optical pickup for recording or reproducing information on or from a digital versatile disk (DVD) adopts an objective lens having a large numerical aperture and a light source of 650 nm wavelength.

Referring to FIG. 1, a conventional optical pickup includes a semiconductor laser 10, a grating 12 to detect a tracking error signal using a 3-beam method, an objective lens 25 for converging an incident light to form a light spot on a recording medium (DVD) 1, a beam splitter 23 for changing an optical path of the incident light, and a photodetector 29 for detecting the incident light and generating a radio frequency (RF) signal and an error signal. The semiconductor laser 10 is a general edge emitting laser for emitting a light of 650 nm.

Also, a collimating lens 21 for collimating the divergent light emitted from the semiconductor laser 10 is placed on an optical path between the semiconductor laser 10 and the objective lens 25. An astigmatism lens 27 is located between the beam splitter 23 and the photodetector 29.

The light emitted from the semiconductor laser 10 passes the beam splitter 23, and is then focused by the objective lens 25 to form a light spot on the recording surface of the recording medium 1. The light reflected from the recording surface of the recording medium 1 travels toward the photodetector 29 via the objective lens 25, the beam splitter 23 and the astigmatism lens 27, and the photodetector 29 generates the RF signal and the error signal.

Here, the size of the light spot formed on the recording surface of the recording medium satisfies the following relationship (1).

$$\text{size of light spot} \sim \frac{\lambda}{NA} \quad (1)$$

where λ represents the wavelength of the semiconductor laser 10, and NA represents the numerical aperture of the objective lens 25. Thus, in order to achieve high-density recording/reproduction, the size of the light spot must be made small by using the semiconductor laser 10 emitting a short wavelength light, and/or the objective lens 25 having a large numerical aperture.

However, when using the objective lens 25 having a large numerical aperture, aberration caused by the tilt of the recording medium increases, thereby lowering the stability of the light spot. Also, the semiconductor laser 10 capable of emitting a short wavelength light is expensive.

Due to the above reasons, the optical pickup of the DVD adopts an objective lens having a numerical aperture of 0.6 and a semiconductor laser emitting 650 nm wavelength light. In this case, the size of the light spot formed on the recording medium 1 becomes 1.08 μm in diameter. However, it is difficult to record 5 gigabytes of information or more on one side of a recording medium of a 120 mm-diameter disk by using an optical pickup forming such a light spot size.

Thus, the optical pickup cannot be adopted to record or reproduce large quantities of information, as in the case of a high definition (HD) television which requires processing of at least 10 gigabytes of information.

SUMMARY OF THE INVENTION

To solve the above problems, it is an object of the present invention to provide an optical pickup capable of recording/ reproducing a large amount of information at high density using a light-emitting diode (LED) whose cost is comparatively low.

Additional objects and advantages of the invention will be set forth in part in the description which follows and, in part, will be obvious from the description, or may be learned by practice of the invention.

According to an aspect of the present invention which achieves the above and other objects, there is provided an optical pickup for recording/reproduction, including a light source unit having a light emitting diode (LED) to emit light and a waveguide to condense the light emitted from the LED; a collimating lens to collimate the light emitted from the waveguide; an objective lens to condense the light passed through the collimating lens to form a light spot on the recording surface of a recording medium; a light path changing unit arranged on an optical path between the waveguide and the objective lens, to change a traveling path of the incident light; and a photodetector to receive the light incident via the objective lens and the light path changing unit after being reflected from the recording medium.

According to another aspect of the object, there is provided an optical pickup for recording/reproduction, including a plurality of light-emitting diodes (LEDs) to emit light; a plurality of waveguides respectively coupled with the LEDs, to condense the light emitted from the LEDs; a coupler to couple the light emitted from the plurality of waveguides onto one optical path; an objective lens to condense the light passed through the collimating lens to form a light spot on the recording surface of a recording medium; a light path changing unit arranged on the optical path between the waveguide and the objective lens, to change the traveling path of the incident light; and a photodetector to receive the light incident via the objective lens and the light path changing unit after being reflected from the recording medium.

Preferably, each LED emits the light having an approximately 550 nm or less wavelength. Also, preferably, each waveguide has a conical shape, and is installed at a respective one of the LEDs.

The optical pickup may further include an optical filter installed between the LED and the light path changing unit, to pass the light of a predetermined wavelength of the light emitted from each LED.

BRIEF DESCRIPTION OF THE DRAWINGS

The above and other objects and advantages of the present invention will become more apparent by describing in detail preferred embodiments thereof with reference to the attached drawings in which.

DESCRIPTION OF THE PREFERRED EMBODIMENTS

Figure 1:
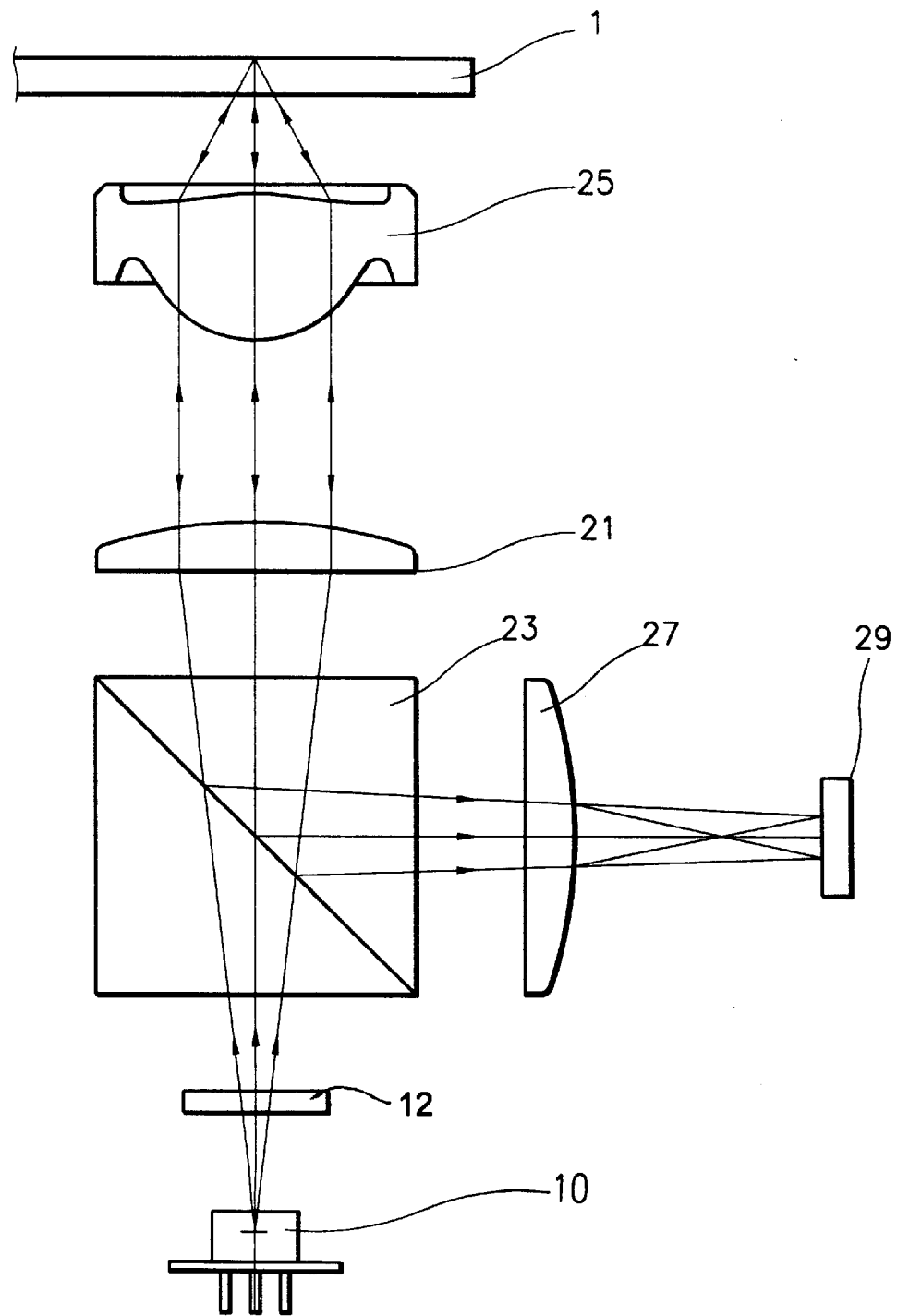
FIG. 1 is a schematic view showing an optical arrangement of a conventional optical pickup.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
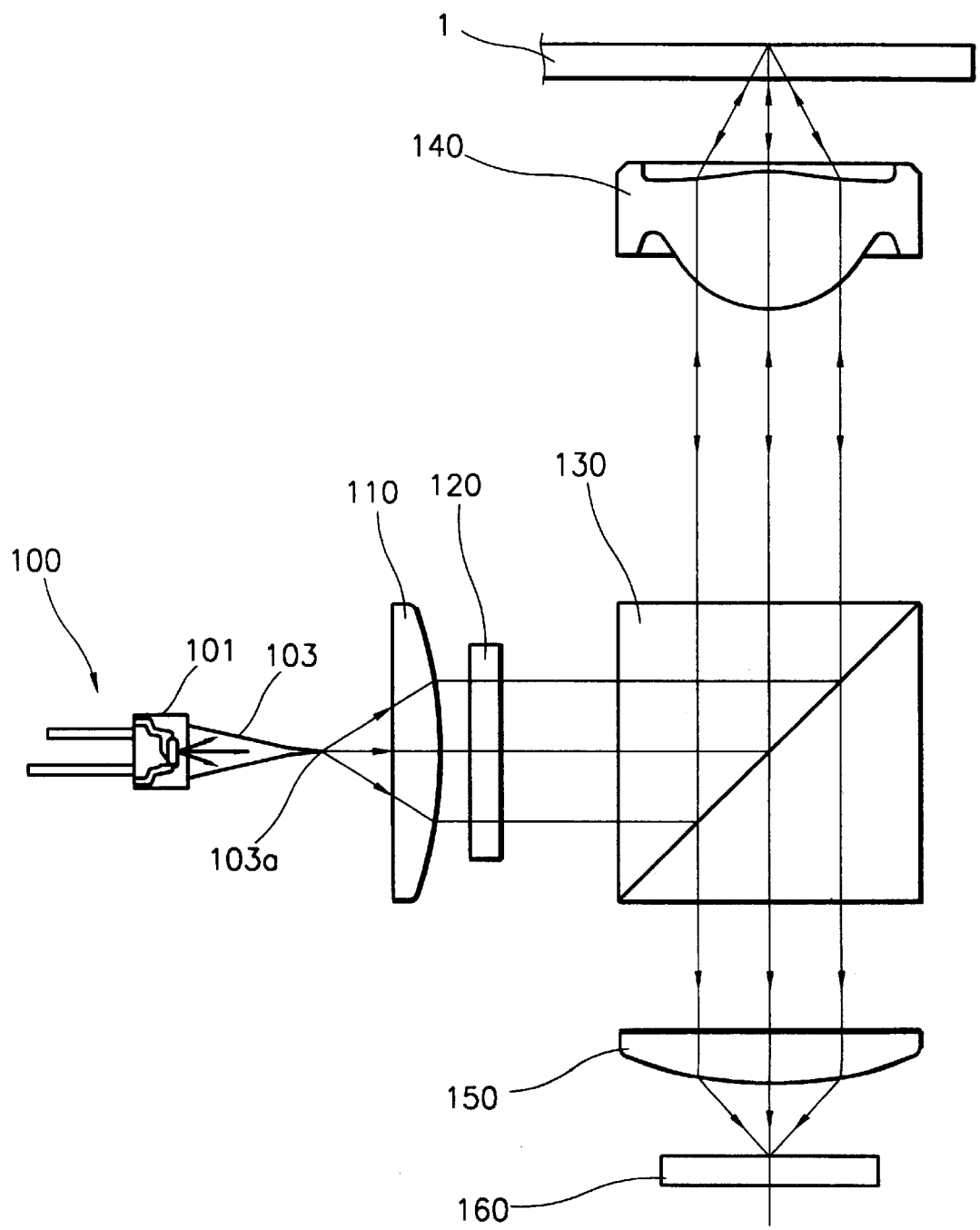
FIG. 2 is a schematic view showing optical arrangement of an optical pickup for recording/reproduction according to a first embodiment of the present invention.

Referring to FIG. 2, an optical pickup for recording/reproduction according to a first embodiment of the present invention includes a light source unit 100 to emit light, a collimating lens 110 to collimate the light emitted from the light source unit 100, light path changing means 130 to change a traveling path of the incident light, an objective lens 140 to converge the incident light, and a photodetector 100 to receive the incident light. Here, a condensing lens 150 may be placed between the light path changing means 130 and the photodetector 160, which condenses the parallel light being incident via the light path changing means 130 to form a light spot on the photodetector 160.

The light source unit 100 includes a light emitting diode (LED) 101 to emit light and a waveguide 103 to converge and transmit the light emitted from the LED 101.

The LED 101 emits a light whose wavelength is 650 nm orless, preferably, approximately 550 nm or less, such that the light spot formed on the recording surface of a recording medium 1 can be optimized.

The waveguide 103 is installed at an output end of the LED 101. To increase the efficiency in converging the light, the waveguide 103 may have a conic shape. That is, the diameter of the waveguide 103 gradually decreases farther away from the output end of the LED 101. Preferably, the diameter of an output end 103a of the waveguide 103 is 10 $\mu$m or less. Also, the output end 103a may have a predetermined length to transmit the condensed light. Here, the conic wall of the waveguide 103 condenses the light by completely reflecting the light emitted from the LED 101.

On the other hand, the waveguide 103 may be an optical fiber with a conical core, and the diameter of the core at the output end 103a may be 10 $\mu$m or less.

The collimating lens 110 is arranged between the LED 101 and the light path changing means 130, that is, at the output end 103a of the waveguide 103, and collimates the light condensed by the waveguide 103. Here, preferably, the collimating lens 110 is a gradient-index (GRIN) lens whose refractive index gradually decreases moving away from the optical axis in the radial direction, so that the GRIN lens has excellent condensing efficiency.

An optical filter 120 installed on the optical path between the LED 101 and the objective lens 140 passes only a predetermined wavelength of the light emitted from the LED 101. That is, only the light having a narrow bandwidth of the light emitted from the LED 101 is incident on the recording medium 1 via the optical filter 120. Here, preferably, the optical filter 120 has a bandwidth within ±10 nm with respect to the central transmission wavelength, that is, a bandwidth within 20 nm. In this case, the light passed through the optical filter 120 has a bandwidth within ±10 nm of the central wavelength, that is, a bandwidth within 20 nm. According to the present invention, even if a low-priced LED 101 is adopted as a light source, a light having a narrow bandwidth can be emitted to provide the same effect as a high-priced semiconductor laser.

The light path changing means 130 reflects most of the light incident from the LED 101 toward the recording medium 1 and transmits the light reflected from the recording medium 1 toward the photodetector 160. The light path changing means 130 may be a beam splitter to transmit or reflect the incident light with a predetermined ratio, or a polarizing beam splitter for transmitting or reflecting the incident light according to a polarization state.

The objective lens 140 is placed on the optical path between the light path changing means 130 and the recording medium 1, and condenses the incident light to form a light spot on the recording surface of the recording medium 1. Preferably, the condensing lens 150 is an astigmatism lens capable of detecting a focusing error signal by an astigmatism method.

The photodetector 160 receives the light reflected from the recording surface of the recording medium 1 to generate an RF signal and an error signal.

In the operation of the optical pickup according to the first embodiment of the present invention, if the light emitted from the light source unit 100 has a wavelength of 400 nm, the size of the light spot formed on the recording surface of the recording medium 1 is about 0.67 $\mu$m by the equation (1). This size is approximately 0.62 times smaller than that formed by the conventional optical pickup. Thus, the recording density is increased by approximately 2.6 times compared to that of the conventional pickup. For example, approximately 13 gigabytes of information or more can be recorded on a 120 mm diameter disk.

Figure 3:
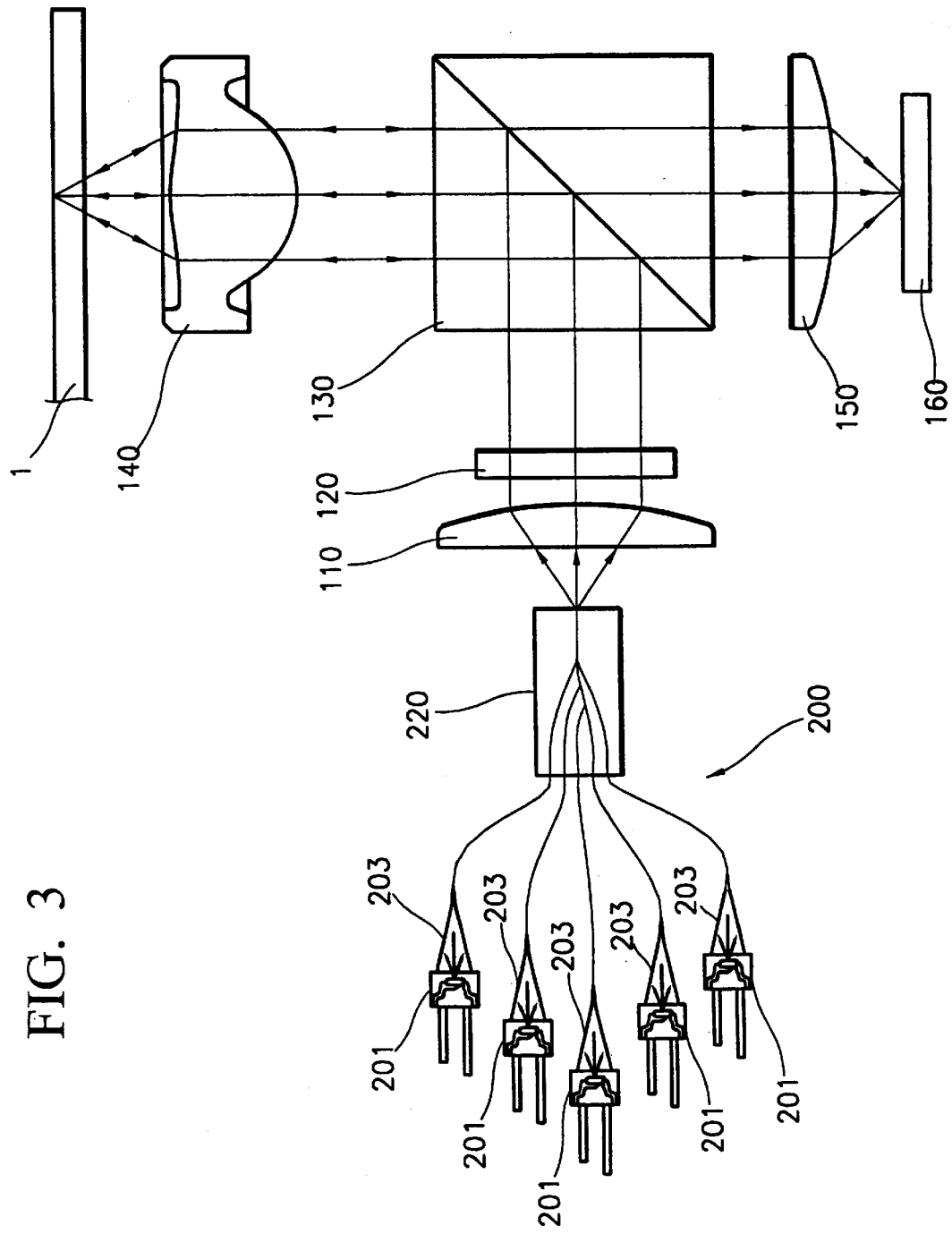
FIG. 3 is a schematic view showing an optical arrangement of an optical pickup for recording/reproduction according to a second preferred embodiment of the present invention.

An optical pickup for recording/reproduction according to a second embodiment of the present invention is shown in FIG. 3. Here, the same reference numerals as those of the previous drawings represent the same elements.

A light source unit 200 includes a plurality of LEDs 201 to emit light, a plurality of waveguides 203 arranged at respective output ends of the LEDs 201, and a coupler 220 to couple the light passed through the plurality of waveguides 203 into one light.

The LEDs 201 may be selectively driven by a switching means (not shown). The coupler 220 sequentially couples the light emitted from the output ends of each waveguide 203 onto one optical path.

In the operation of the optical pickup according to the second embodiment of the present invention, since the plural LEDs 201 operate selectively, the intensity of the light spot can be controlled whether recording information which requires light of a comparatively high intensity or reproducing information which requires comparatively less light intensity, respectively. The LEDs may have the same or different intensities from each other, with the full intensity of the light spot formed on the recording medium being controlled to be appropriate for a reproduction or recording of information by selectively operating each of the LEDs.

As described above, the optical pickup of the present invention adopts a lower-priced LED, so that the manufacturing costs are low. Also, the optical pickup includes a conical waveguide to condense the light emitted from the LED, thereby improving condensing efficiency.

In addition, by adopting a plurality of LEDs which operate selectively, a light spot of different desired intensities can be formed.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical pickup for recording/reproducing information to/from a recording medium, comprising:
    a light source unit including a light emitting diode (LED) which emits light and a waveguide which condenses the light emitted from the LED and emits the light;
    a collimating lens which collimates the light emitted from the waveguide;
    an objective lens which condenses the light passing through the collimating lens to form a light spot on a recording surface of the recording medium;
    a light path changer arranged on an optical path between the waveguide and the objective lens which changes a traveling path of light incident on said light path changer; and
    a photodetector which receives light reflected from the recording medium via the objective lens and the light path changer.

2. The optical pickup of claim 1, wherein the waveguide has a conical shape, and is installed at the LED.

3. The optical pickup of claim 1, wherein the LED emits the light having an approximately 550 nm or less wavelength.

4. The optical pickup of claim 1, wherein the collimating lens has an optical axis and is a gradient-index (GRIN) lens whose refractive index changes along a radial direction of the optical axis.

5. The optical pickup of claim 1, further comprising an optical filter installed between the LED and the light path changer, to pass only the light of a predetermined wavelength of the light emitted from the LED.

6. An optical pickup for recording/reproducing information to/from a recording medium, comprising:
    a plurality of light emitting diodes (LEDs) to emit light;
    a plurality of waveguides respectively coupled to the plurality of LEDs, to condense the light emitted by the plurality of LEDs;
    a coupler to couple the condensed light emitted from each of the plurality of waveguides onto one optical path and to emit a combined light;
    a collimating lens to collimate the combined light emitted from the coupler;
    an objective lens to condense the collimated light to form a light spot on a recording surface of the recording medium;
    light path changer arranged on the optical path between the coupler and the objective lens, to change the traveling path of light incident upon said light path changer; and
    a photodetector to receive light reflected from the recording medium via the objective lens and the light path changer.

7. The optical pickup of claim 6, wherein each waveguide has a conical shape, and is installed at a respective one of the LEDs.

8. The optical pickup of claim 6, wherein each LED emits the light having approximately 550 nm or less wavelength.

9. The optical pickup of claim 6, wherein the collimating lens has an optical axis and is a gradient-index (GRIN) lens whose refractive index changes along a radial direction of the optical axis.

10. The optical pickup of claim 6, further comprising an optical filter installed between the LED and the light path changer, to pass only the light of a predetermined wavelength of the light emitted from the LED.

11. An optical pickup to at least one of record data to and reproduce data from an optical recording medium, the optical pickup comprising:
    a light emitting diode (LED) to emit a light;
    a wavelength condenser which condenses the light emitted from said LED;
    a beam forming unit to shape and direct the light from said condenser;
    an objective lens to focus the light from said beam forming unit on the optical recording medium; and
    a photodetector to receive light which is reflected from the optical recording medium and which is passed through said objective lens and directed by said beam forming unit.

12. The optical pickup as claimed in claim 11, wherein said beam forming unit comprises:
    a collimator to collimate the light output from said condenser; and
    a light path changing unit, arranged between said condenser and said objective lens, to direct the collimated light toward said objective lens and to direct the light reflected from the optical recording medium and passed through said objective lens toward said condenser and photodetector.

13. The optical pickup as claimed in claim 12, wherein said condenser is a waveguide having a conic shape.

14. The optical pickup as claimed in claim 12, further comprising:
    a plurality of LEDs to emit light;
    a plurality of condensers to respectively condense the light emitted from said plurality of LEDs; and
    a coupler to couple the light passed through said condenser and said plurality of condensers onto one optical path;
    wherein said collimator collimates the light on the one optical path output by said coupler.

15. The optical pickup as claimed in claim 14, wherein said LED and plurality of LEDs selectively operate, to adjust an intensity of the light on the one optical path and output by said coupler.

16. The optical pickup as claimed in claim 14, wherein said condenser and each of said plurality of condensers is a waveguide having a conic shape.

17. The optical pickup as claimed in claim 14, further comprising an optical filter positioned between said collimator and said light path changing unit, to pass only a predetermined wavelength of the light emitted from said LED and said plurality of LEDs.

18. The optical pickup as claimed in claim 17, wherein the optical filter has a bandwidth of not greater than 20 nm.

19. The optical pickup as claimed in claim 14, wherein a wavelength of the light emitted from said LED and said plurality of LEDs is no greater than 550 nm.

20. The optical pickup as claimed in claim 11, further comprising an optical filter positioned between said LED and said light path changing unit, to pass only a predetermined wavelength of the light emitted from said LED.

21. The optical pickup as claimed in claim 11, wherein a wavelength of the light emitted from said LED is no greater than 550 nm.

22. The optical pickup as claimed in claim 11, wherein said condenser is an optical fiber with a conical core.

23. The optical pickup as claimed in claim 22, wherein the diameter of the conical core at an output end is no greater than 10 μm.

24. A method of recording data to and reproducing data from an optical recording medium, the method comprising:

provinding a plurality of light emitting diodes which emit non-coherent light;

selectively energizing a lesser number of said light emitting diodes than the plurality of said light emitting diodes to reproduce the data and selectively energizing the plurality of said light emitting diodes to record the data;

individually condensing the non-coherent light emitted by each selectively energized light emitting diode;

coupling the individually condensed non-coherent lights onto one optical path to provide a combined non-coherent light;

collimating the combined non-coherent light;

transmitting the collimated light onto the optical recording medium as a spot for recording or reproducing the data; and detecting light reflected from the optical recording medium for reproducing the data.

* * * * *

UNITED STATES PATENT AND TRADEMARK OFFICE
CERTIFICATE OF CORRECTION

PATENT NO. : 6,233,217 B1
DATED : May 15, 2001
INVENTOR(S) : Jang-hoon Yoo et al.

It is certified that error appears in the above-identified patent and that said Letters Patent is hereby corrected as shown below:

<u>Column 6,</u>
Line 11, change "wavelength" to -- waveguide --.

Signed and Sealed this

Twenty-sixth Day of February, 2002

*Attest:*

JAMES E. ROGAN
*Director of the United States Patent and Trademark Office*

*Attesting Officer*